United States Patent [19]

Slonim

[11] Patent Number: 4,857,022
[45] Date of Patent: Aug. 15, 1989

[54] AMPHIBIOUS VESSEL

[76] Inventor: David M. Slonim, P.O. Box 1869, 3, Ourania Str., Nicosia, Cyprus

[21] Appl. No.: 239,012

[22] Filed: Aug. 29, 1988

Related U.S. Application Data

[63] Continuation of Ser. No. 031,690, Mar. 27, 1987, abandoned.

[51] Int. Cl.⁴ .............................................. B63H 1/28
[52] U.S. Cl. ......................................... 440/48; 440/98; 440/100; 180/7.2
[58] Field of Search ..................... 440/48, 98, 99, 100; 180/7.2; 114/292, 270

[56] References Cited

U.S. PATENT DOCUMENTS

| | | | |
|---|---|---|---|
| 2,727 | 7/1842 | Jones | 440/48 |
| 669,210 | 3/1901 | Burch | 440/48 |
| 864,106 | 8/1907 | Peavey | 180/7.2 |
| 2,379,235 | 6/1945 | Hughes | 440/48 |
| 2,388,711 | 11/1945 | Sawyer | 440/48 |
| 3,123,039 | 3/1964 | Bridwell | 440/48 |
| 3,304,900 | 2/1967 | Greenwood | 114/292 |
| 3,605,296 | 9/1971 | Dysart | 440/100 |
| 4,476,948 | 10/1984 | Komoto et al. | |
| 4,552,538 | 11/1985 | Galluzzo et al. | 114/270 |

FOREIGN PATENT DOCUMENTS

| | | | |
|---|---|---|---|
| 686268 | 3/1965 | Italy | 440/100 |
| 1127149 | 9/1968 | United Kingdom | |
| 1288779 | 9/1972 | United Kingdom | |
| 1349512 | 4/1974 | United Kingdom | |

Primary Examiner—Sherman D. Basinger
Assistant Examiner—Thomas J. Brahan
Attorney, Agent, or Firm—Young & Thompson

[57] ABSTRACT

An amphibious vessel has at least two substantially parallel, elongate flotation members (2, 3) which operate on water as hulls. Each flotation members (2, 3) is rotatable about a longitudinal axis thereof so as to be rollable over land. The rotation of one flotation member (2) may be power-driven, while another flotation member (3) may be steerable during travel over land.

6 Claims, 1 Drawing Sheet

AMPHIBIOUS VESSEL

This is a continuation of application Ser. NO. 031,690, filed 3/27/87, now abandoned.

The invention relates to amphibious vessels.

Amphibious vessels are of particular advantage when launching and landing a vessel in the absence of a landing strip of jetty. Vessels with wheels projecting below a hull of hulls are known, as are vessels with wheels adjustable in position with respect to a hull. In all known cases, the means by which the vessel travels over land and over water are different. Unless complex mechanisms are used to retract wheels or alter the relative positions of the hull and wheels, the travel of the vessel on water is impeded, e.g. by wheels projecting beneath the hull. This lowers the maximum attainable speed of any given vessel.

An object of the invention is to provide an amphibious vessel which travels on land and water by the same means such as no complex mechanism is required to alter the relative positions of the hull and wheels, and the travel of the vessel on water is not impeded.

The invention provides an amphibious vessel comprising at least two substantially parallel, elongate flotation members operable as hulls, wherein at least part of each flotation member is rotatable about a longitudinal axis thereof for rolling travel over land.

The vessel moves on water in a direction parallel to the longitudinal axes of the flotation members and on land in a direction perpendicular thereto by means of the flotation members acting as rollers.

The flotation members are preferably each formed as a single rotatable member and are more preferably cylindrical over at least part of their length.

Advantageously, the rotation of at least one of the flotation members about the longitudinal axis thereof is power driven and at least one of the flotation members may be steerable so as to facilitate travel over land.

Am embodiment of the invention will now be described with reference to the accompanying drawing, wherein.

Figure 1:
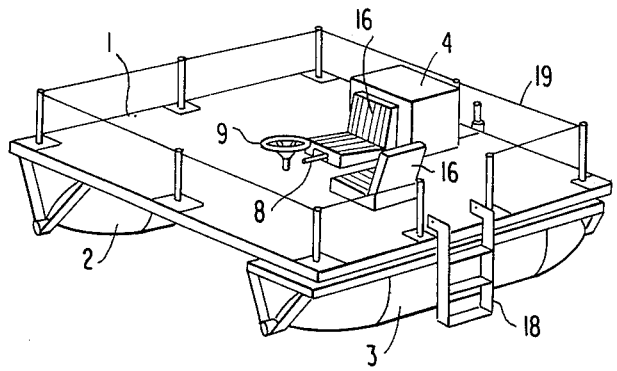
FIG. 1 is a perspective view of a vessel according to the invention.
Figure 2:
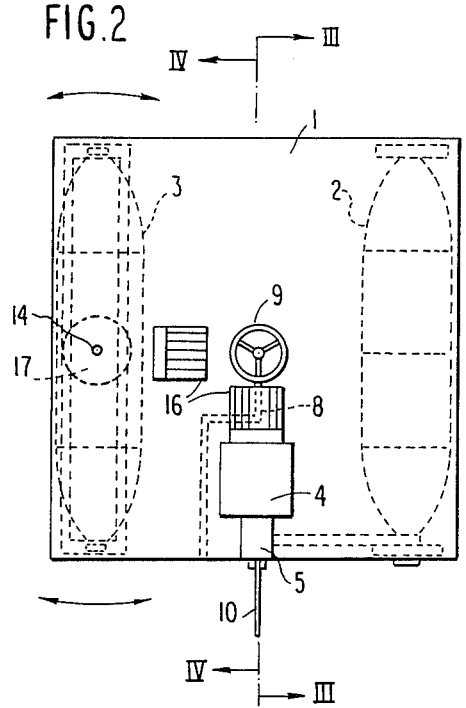
FIG. 2 is a plan view of the vessel of FIG. 1.
Figure 3:
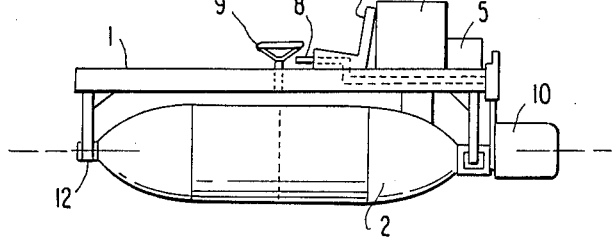
FIG. 3 is a sectional view taken along the line III—III of FIG. 2.
Figure 4:
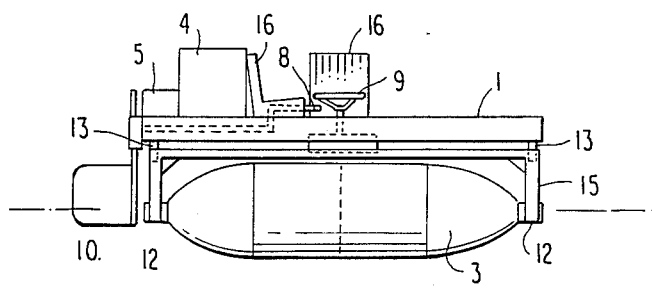
FIG. 4 is a sectional view taken along the line IV—IV of FIG. 2.
Figure 5:
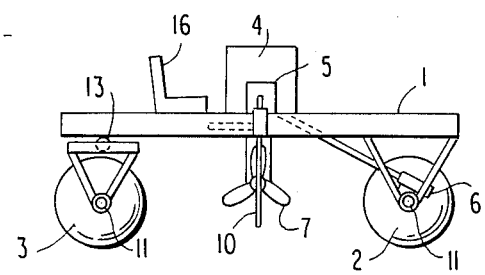
FIG. 5 is a rear view of the vessel of FIG. 1.

The vessel shown in the drawings is a simple catamaran with a deck 1 and two parallel flotation members 2, 3 which are supported beneath opposite edges of the deck 1. Each flotation member 2, 3 has an axle 11 along the longitudinal axis thereof. Bearings 2 at each end of both axles 11 allow the flotation members 2, 3 to rotate with the axles 11 about the longitudinal axes thereof. Each flotation member may be formed of several individually buoyant hollow sections coupled together, so that, if the member is pierced, only the pierced section will be flooded, leaving the other sections able to support the vessel. Each section may have a screw tap so that liquid may be put in or taken out in the case of need. The flotation members may be formed from plastics material, glass fiber, aluminum, bronze, steel or any other suitable material.

The vessel is provided with an engine 4, a gearbox 5 and a propeller 7 by means of which the vessel may be power-driven on water. A drive shaft or worm gear 6 connects the gearbox 5 and the axle 11 of one flotation member 2 in order to allow the rotation of the flotation member 2 to be power-driven by the engine 4.

The non-driven flotation member 3 is rotatably mounted beneath the deck 1 within a frame 15. The frame 15 is rotatably mounted on the deck 1 by means of a pin 14 such that the frame 15 may be swivelled in a plane parallel to the deck 1. Roller 13 are provided at each end of the upper portion of the frame 15 in order to provide movable contact points between the frame 15 and the deck 1 thus reducing stresses in the upper portion of the frame 15. The frame 15 is rotated about the pin 14 by means of a steering wheel 9.

Additional features of the vessel include passenger seats 16, (one seat being disposed behind the steering wheel 9 in parallel with the flotation members; for steering the vessel at sea and another seat facing the driven flotation member 2), a safety rail 19, with an entry gap leading to a boarding ladder 18 which is preferably hinged at deck level so that, when at sea, the ladder may be raised to form a gate, closing the entry gap in the safety rail 19.

The vessel as described above may be launched from a beach or shore in the following manner. The vessel is maneuvered close to the waters edge by rolling on the flotation members 2, 3 and steering by the steering wheel 9. The power-driven flotation member 2 is positioned furthest from the waters edge. The passengers may then board the vessel by means of the ladder 18 which is either raised, as described above or may be removed and stored. The engine 4 and gearbox 5 are connected to the power-driven flotation member 2 such that the vessel may driven into the water, the power-driven flotation member 2 being the last to leave the land in order that traction be retained as long as possible. The engine 4 and gearbox 5 are then connected to the propeller 7 and the vessel is power driven on the water in a direction parallel to the flotation members 2, 3. Steering is achieved by means of a rudder 10 controlled by a tiller 8. The vessel may be landed by bringing the power-driven flotation member 2 into contact with the land and connecting the engine 4 and gearbox 5 to the power-driven flotation member 2. The vessel may then be driven out of the water and onto the land.

The invention is not limited to a vessel as described above. The vessel need not have an engine but may be provided with a sail or paddles for travel on water. The flotation members need not be power-driven; the vessel may be maneuvered manually over land or driven by means of pedals. For example, a small pleasure craft may have foot-operated pedals connectable to rotatable paddles for travel on water. The pedals may optionally be used to drive one of the flotation members for travel over land.

The flotation members are shown in the drawings as being cylindrical with semi-ovoid ends. This arrangement provides a cylindrical surface acting as a roller and a streamlined profile for travel on water but may be varied to increase the streamlining, provided that the flotation member remains rollable over land.

The flotation member may be slightly corrugated along its length to give a better grip when landing on sand or gravel and such slight corrugations would not disturb the water flow around the flotation members significantly.

It is a particular advantage of the described embodiment of the invention that the vessel is able to land on sand or marshy beach without sinking into the sand or marsh when landing, unlike proposed amphibious vessels with foldable wheels.

What is claimed is:

1. An amphibious vessel comprising a deck and at least two substantially parallel, elongate flotation members operable as hulls and disposed under the deck, at least part of each flotation member being rotatable about a longitudinal axis thereof for rolling travel over land, each flotation member having a ground-engaging surface, means separate from said flotation members for propelling the vessel in water in a direction parallel to said flotation members, means for selectively driving only said flotation members on land and only said propelling means in water, means to steer at least one of the flotation members, said at least one steerable flotation member being rotatably mounted within a frame extending lengthwise thereof about an upright axis perpendicular to the longitudinal axis thereof, said frame including uprights that are disposed in vertical planes and that are supported at their lower ends on opposite ends of said at least one steerable flotation member, and rollers at each end of the frame, said rollers being disposed in the vertical planes of said uprights and in movable contact with the underside of the deck to reduce stress in the frame.

2. An amphibious vessel as claimed in claim 1, wherein each flotation member is formed as a single rotatable member.

3. An amphibious vessel as claimed in claim 1, wherein at least part of each flotation member is cylindrical.

4. An amphibious vessel as claimed in claim 1, wherein the flotation members are air-filled hollow plastic members.

5. An amphibious vessel as claimed in claim 1, wherein two flotation members are provided such that the vessel acts as a catamaran during travel on water.

6. An amphibious vessel as claimed in claim 1, wherein each flotation member is formed from a plurality of individually buoyant sections coupled together.

* * * * *